United States Patent
Behrman

(10) Patent No.: US 9,095,225 B2
(45) Date of Patent: Aug. 4, 2015

(54) INFANT CHANGING BOARD

(71) Applicant: Stacey Behrman, Craig, CO (US)

(72) Inventor: Stacey Behrman, Craig, CO (US)

( * ) Notice: Subject to any disclaimer, the term of this patent is extended or adjusted under 35 U.S.C. 154(b) by 120 days.

(21) Appl. No.: 14/040,613

(22) Filed: Sep. 27, 2013

(65) Prior Publication Data

US 2015/0089745 A1 Apr. 2, 2015

(51) Int. Cl.
*A47D 5/00* (2006.01)
*A47D 13/08* (2006.01)
*A47D 15/00* (2006.01)
*B60N 2/26* (2006.01)
*B60N 2/28* (2006.01)

(52) U.S. Cl.
CPC *A47D 5/00* (2013.01); *A47D 15/00* (2013.01); *B60N 2/2812* (2013.01); *A47D 13/08* (2013.01); *B60N 2/26* (2013.01)

(58) Field of Classification Search
CPC ......... A47D 5/00; A47D 5/003; A47D 5/006; A47D 7/00; A47D 7/01; A47D 7/04; A47D 9/00; A47D 9/005; A47D 13/00; A47D 13/08; A47D 13/083; A47D 15/00; A47D 15/001; B60N 2/26; B60N 2/28; B60N 2/2803; B60N 2/2806; B60N 2/2809; B60N 2/2812; B60N 2002/2818; A01K 1/035; A01K 1/0353
USPC ............ 5/655, 652, 653, 657, 420, 417, 93.1, 5/93.2, 94, 95, 118, 496, 498, 499, 500, 5/502, 737, 738, 503.1, 504.1, 658, 947; 297/219.1, 219.12, 229, 230.1, 230.11, 297/230.12, 230.13, 230.14, 250.1, 253, 297/254, 255; 119/28.5, 771
See application file for complete search history.

(56) References Cited

U.S. PATENT DOCUMENTS

| | | | | |
|---|---|---|---|---|
| 1,963,739 A * | 6/1934 | Engel | ................................ | 5/500 |
| 3,054,637 A * | 9/1962 | Pambello | ......................... | 297/4 |
| 3,659,297 A * | 5/1972 | Schutz | .............................. | 5/655 |
| 3,791,694 A * | 2/1974 | Roberts et al. | ............ | 297/250.1 |
| 4,666,207 A * | 5/1987 | Quartano | ..................... | 297/229 |
| 4,935,973 A * | 6/1990 | Behrman | ......................... | 5/2.1 |
| 4,943,105 A * | 7/1990 | Kacar et al. | ................ | 296/24.31 |
| 5,335,968 A * | 8/1994 | Sheridan et al. | ........... | 297/250.1 |
| D356,414 S * | 3/1995 | Fridolph | ........................ | D34/27 |
| 6,327,726 B1 * | 12/2001 | Weber | ............................... | 5/655 |
| 6,390,345 B1 * | 5/2002 | Brown et al. | ................. | 224/578 |
| 6,692,072 B2 * | 2/2004 | Nelson et al. | .............. | 297/250.1 |
| 7,000,985 B2 * | 2/2006 | Belgarde | ...................... | 297/255 |
| 7,204,205 B2 * | 4/2007 | O'Donnell | .................... | 119/771 |
| 7,261,375 B2 * | 8/2007 | Godshaw et al. | ......... | 297/228.12 |
| 7,287,813 B2 * | 10/2007 | Aliev | ......................... | 297/219.1 |
| 7,347,494 B2 * | 3/2008 | Boyle et al. | .................. | 297/253 |
| 7,448,345 B1 * | 11/2008 | O'Donnell | ................... | 119/28.5 |

(Continued)

*Primary Examiner* — Robert G Santos

(57) ABSTRACT

An improved infant changing board utilizes a shaped support board enclosed in a washable cover and a safety strap in order to provide a relatively rigid surface upon which a caregiver can place an infant in order to change his or her diaper. The infant changing board is shaped so as to fit within most infant carriers and can transition from an upright position to an infant changing configuration. In the upright configuration, the apparatus is stored mainly behind the back of the infant, between him or her and the back support of the infant carrier. In the infant changing configuration, the apparatus is pulled forward and out to rest in an approximately horizontal position, yet securely braced within the carrier. In this configuration, the caregiver can place the infant on the changing board and have easy access to the diaper and the infant's groin area for changing.

16 Claims, 5 Drawing Sheets

(56) References Cited

U.S. PATENT DOCUMENTS

| | | | |
|---|---|---|---|
| 7,488,038 B2* | 2/2009 | Boyle et al. | 297/255 |
| 7,530,635 B2* | 5/2009 | Schramek-Flye | 297/255 |
| 8,316,490 B1* | 11/2012 | Bilak et al. | 5/655 |
| 8,701,231 B2* | 4/2014 | Malet | 5/655 |
| 8,936,314 B2* | 1/2015 | Lai et al. | 297/254 |
| 2002/0167214 A1* | 11/2002 | Nelson et al. | 297/485 |
| 2005/0116518 A1* | 6/2005 | Belgarde | 297/254 |
| 2005/0236874 A1* | 10/2005 | Godshaw et al. | 297/35 |
| 2005/0253444 A1* | 11/2005 | Godshaw et al. | 297/452.12 |
| 2005/0284415 A1* | 12/2005 | O'Donnell | 119/771 |
| 2007/0001495 A1* | 1/2007 | Boyle et al. | 297/253 |
| 2007/0040441 A1* | 2/2007 | Boyle et al. | 297/467 |
| 2007/0194589 A1* | 8/2007 | Aliev | 296/39.1 |
| 2008/0290707 A1* | 11/2008 | Schramek-Flye | 297/255 |
| 2012/0159708 A1* | 6/2012 | Malet | 5/417 |
| 2014/0167462 A1* | 6/2014 | Lai et al. | 297/250.1 |

* cited by examiner

INFANT CHANGING BOARD

TECHNICAL FIELD

The present invention relates generally to the field of infant care, and more particularly to a universal, improved infant changing board that can be used with most infant carriers.

BACKGROUND

The field of infant carriers for motor vehicles has changed dramatically over the years. Relatively recently, there has been a large push towards carriers that secure the infant via shoulder belts in addition to a lap belt/leg belts and groin belt.

DETAILED DESCRIPTION

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below in the accompanying Figures. The following detailed description provides a comprehensive review of the drawings in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Figure 1:
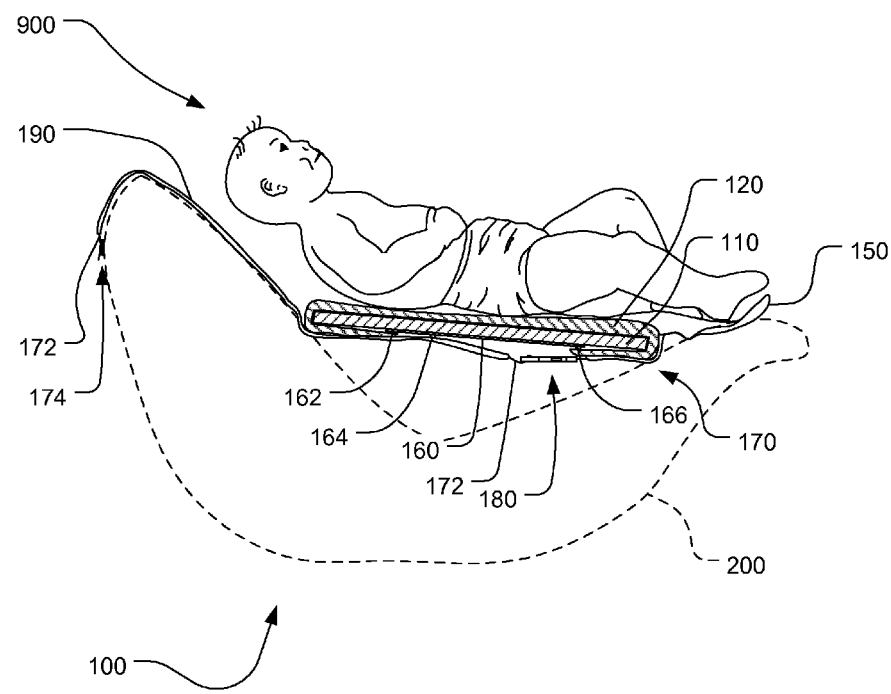
FIG. 1 illustrates a side elevation view of an exemplary embodiment of an infant changing board in an infant changing configuration.

Referring now to the drawings, FIG. 1 illustrates a side elevation view of an exemplary embodiment of an infant changing board 100 in an infant changing configuration. The infant changing board 100 is illustrated in position within an infant carrier/car seat 200. There are many different varieties of infant carriers, and, to the extent possible, the infant changing board 100 is designed to fit universally within them. While in the infant changing configuration, the infant changing board 100 spans what is normally the lower seat portion of the carrier, effectively raising the infant 900 up and partially out of the carrier so that a caregiver can easily access the infant 900 and his or her diaper so it can be changed. The infant changing board 100 rests securely in the infant changing configuration so the caregiver has a sturdy work area without having to fear for the child under his or her care during the changing process.

The infant changing board 100, has a number of components which provide the improved functionality of the invention, including: a shaped support board 110, a washable cover 120, a cover retention strap 160, a safety strap stub 170, an adjustment handle 150, a safety strap connector 180, a safety strap extension 172, a strap cover 190, a strap positioner 164, and a strap lock 174.

The shaped support board 110 is a generally flat board that is shaped so as to fit within a child carrier. It has special side cut-outs to allow direct access for the ubiquitous infant carrier shoulder straps to clear the shaped support board 110 and secure the infant 900 in the carrier. Above and below the cut-outs, the infant support board 110 flares outwards to provide extra support for the infant's 900 head and bottom. The board 110 can be made from plastic, metal, plywood, or any other sufficiently light and yet rigid material that will adequately support the infant.

The washable cover 120 is shaped so as to fit over the infant support board 110 and provide a more comfortable, and multi-function surface than that provided by the board 110 itself. The cover 120 can include a pattern, design, color(s), etc. on its surface for aesthetics. Additionally, the washable cover 120 is easily removed and reattached to allow it to be quickly washed as needed. The cover can incorporate padding or other similar cushioning material so that the infant isn't resting directly against a rigid surface. The washable cover 120 further cushions the corners and edges of the infant support board 110 in order to keep the infant safe. As the infant support board 110 is relatively rigid, the washable cover 120 should be made from relatively stretchy material(s) so that it can be slipped on and off the board 110. Alternatively, a side access port can be incorporated in the washable cover 120 which would then be shut via a zipper, snaps, hook and loop material, or some other securing means.

A cover retention strap 160 is attached to the back of the washable cover 120 via a first retention strap attachment 162 and a second retention strap attachment 166. The cover retention strap 160 extends along the back of the infant support board 110, attaching the top of the washable cover 120 to the bottom of the washable cover 120 in order to retain the washable cover 120 on the infant support board 110. The first and second retention strap attachments 162 and 166 can include one permanent attachment point and one re-attachable point in one embodiment (as illustrated in FIG. 1). In another embodiment, both attachments can be re-attachable. As shown in FIG. 1, the first retention strap attachment 162 can be simple sewn attachment point. The second retention strap attachment 166 is illustrated in FIG. 1 as being a snap closure, other attach/detach type closures are contemplated for either or both retention strap attachments 162 and 166.

Extending from the bottom of the washable cover 120 are a safety strap stub 170 and an adjustment handle 150. The adjustment handle 150 comprises a strap or similar device which extends out from the cover and provides the caregiver with a means of adjusting the position of the infant changing board 100. When the board 100 is in the upright position (see FIG. 2), a caregiver can simply pull on the adjustment handle 150 to reposition the board 100 into the infant changing configuration, as shown in FIG. 1. The safety strap stub 170 also extends out from approximately the bottom edge of the board 100. In normal operation, the strap stub 170 is wrapped under the infant changing board 100 and back towards the top of the infant carrier 200.

The safety strap stub 170 includes an elastic strap (or other stretchy material) inside a removable safety strap stub sleeve. The stub sleeve is removable so that it can be washed easily. At the free end of the safety strap stub 170 is a safety strap connector 180 which can be a buckle or other similar device for quickly attaching and detaching the safety strap stub 170 to the safety strap extension 172. This configuration allows for the easy removal of the safety strap extension 172 from the washable cover 120 as needed (e.g., for washing the cover 120).

The safety strap extension 172 can be a similar elastic strap as that used in the safety strap stub 170. In another embodiment, other stretchable materials can be used. The safety strap extension 172 extends from the safety strap connector 180 to the top, back of the infant carrier 200. When the infant changing board 100 is in the infant changing configuration (as shown in FIG. 1), the safety strap extension 172 serves to keep the board 100 from sliding out of the infant carrier 200. The tension provided by the elastic safety strap extension 172 ensures that the infant carrier 200 is unable to slide downwards and completely out of the carrier 200. And yet, when the caregiver repositions the board 100 in the upright configuration (see FIG. 2), the elastic safety strap extension 172 contracts and easily collapses onto itself. Although illustrated in FIG. 2 as having extra, loose loops when in the upright configuration, strong enough elastic can be employed in the safety strap extension 172 so that no extra loose loops are present.

Similar to the safety strap stub 170, the safety strap extension 172 should include a strap cover 190. This can be a simple fabric sleeve that covers and protects the extension 172 and yet is removable for washing when needed. The strap cover 190 extends with the elastic safety strap extension 172 when the board 100 is in the infant changing configuration shown in FIG. 1 and then bunches up on itself when in the upright configuration of FIG. 2. Attached on the strap cover 190 is a strap positioner 164. The strap positioner 164 can be a snap or some other easily attached/detached connector which serves to retain the safety strap extension 172 in position in approximately the center of the back of the shaped support board 110. By virtue of being located on the strap cover 190, the strap positioner 164 functions to keep the safety strap extension 172 in position, while allowing the elastic nature of the extension 172 to cause the strap extension 172 to extend and contract without interference from the strap positioner 164.

The safety strap extension 172 can be removable affixed to the top rear of the infant carrier via a strap lock 174. As shown in FIG. 1, the strap lock 174 comprises a hook and loop attachment, where one component is affixed to the end of the safety strap extension 172 wile the other is affixed to the top rear of the infant carrier. The caregiver can then attach or detach the safety strap extension as needed for washing, etc. It is preferable that the loop material be attached to the end of the safety strap extension 172. In other embodiments, other types of attach/detach connectors are used in the strap lock 174. In yet another embodiment, the strap lock 174 permanently affixes the safety strap extension 172 to the infant carrier 200. The elastic nature of the extension 172 allows the strap lock 174 to be attached at various locations on the back of variously sized carriers 200.

Figure 2:
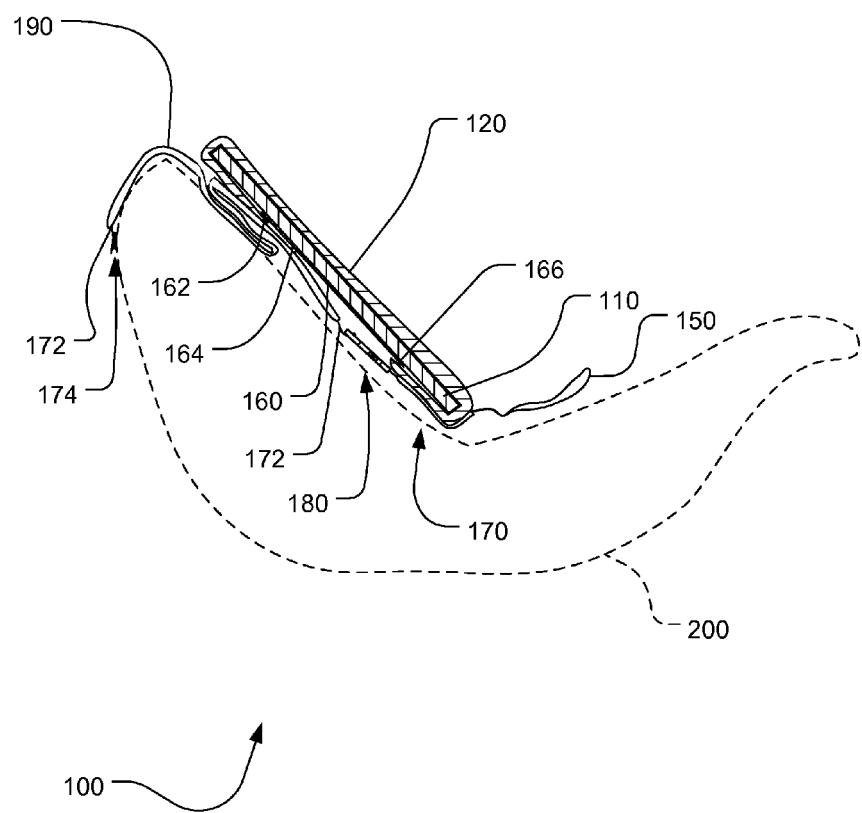
FIG. 2 illustrates a side elevation view of an exemplary embodiment of an infant changing board in an upright configuration.

FIG. 2 illustrates a side elevation view of an exemplary embodiment of an infant changing board 100 in an upright configuration. The components illustrated in FIG. 2 include those shown in FIG. 1. In the upright configuration, the infant changing board 100 fits between the back of the infant 900 and the infant carrier 200. This location keeps the infant changing board 100 in a quick and easy access location, while being unobtrusive and completely out-of-the-way. Additionally, because the shaped support board 110 and/or the washable cover 120 are cushioned/padded, they provide extra cushioning for the infant. Although not visible in FIG. 2, the cut-outs of the support board 110 allow the shoulder harness straps of the infant carrier to be utilized while the infant changing board 100 is in the upright configuration.

Figure 3:
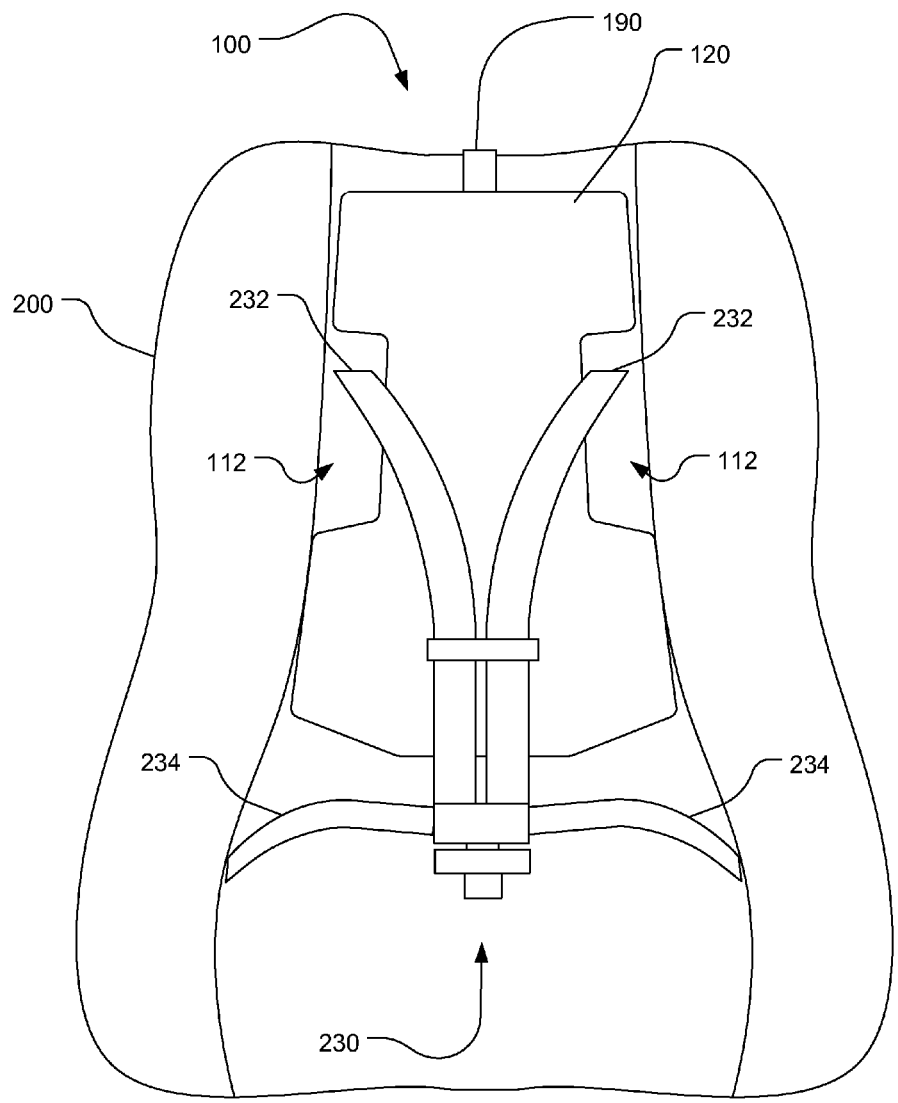
FIG. 3 illustrates a front perspective view of an exemplary embodiment of an infant changing board in an upright configuration.

FIG. 3 illustrates a front perspective view of an exemplary embodiment of an infant changing board 100 in an upright configuration. The infant carrier 200 has an infant safety harness 230 comprising a pair of shoulder straps 232 and a pair of leg straps 234. The safety harness 230 may also include a groin strap. The all important cut-outs 112 are easily seen in this view. They allow the carrier's 200 shoulder straps 232 to clear the infant changing board 100 so they can work effectively to retain the infant in the carrier. The elongated nature of the cut-outs 112 is important since the shoulder straps 232 can be repositioned up and down in many infant carriers 200 to adjust to the size of the infant.

Since the washable cover 120 of the infant changing board 100 can completely enclose the shaped support board 110 from the front, the shaped support board 110 is not visible in FIG. 3. The strap cover 190 is visible extending up and over the top of the infant carrier 200.

Figure 4:
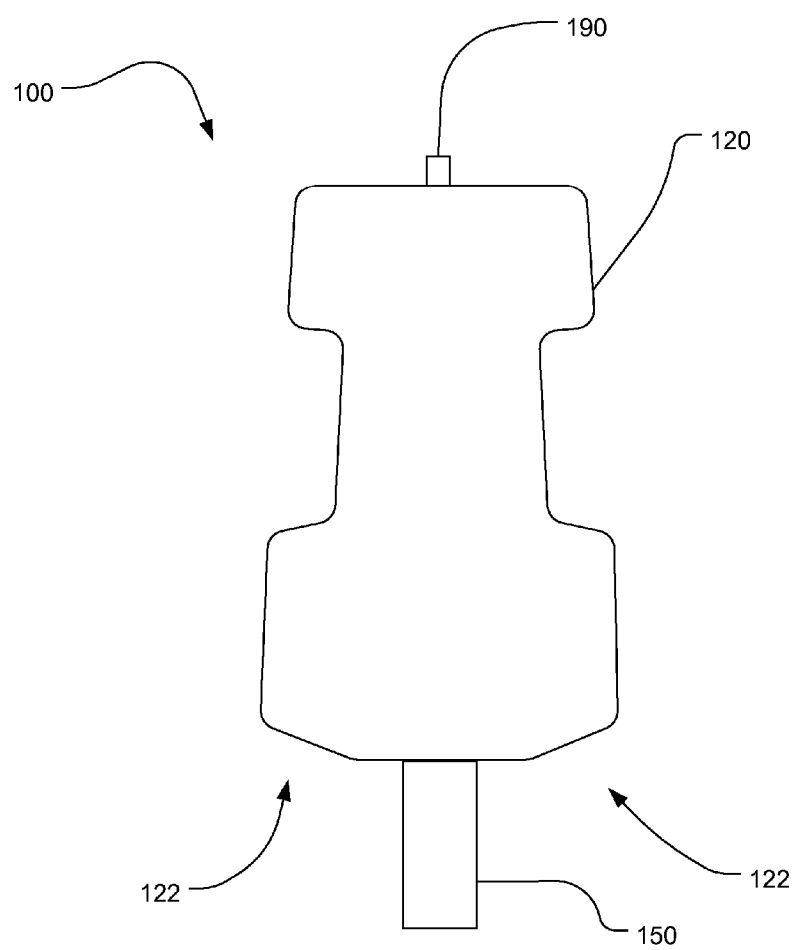
FIG. 4 illustrates a front perspective view of an exemplary embodiment of an infant changing board in an upright configuration.

FIG. 4 illustrates a front perspective view of an exemplary embodiment of an infant changing board 100 in an upright configuration. The infant changing board 100 is shown outside of the infant carrier in FIG. 4. The strap cover 190 is visible in FIG. 4 as is the adjustment handle 150. It is important to note the clipped lower corners of the infant changing board visible in FIG. 4. The cover 120 and board 110 are clipped and rounded on the outside corners to allow the board 110 to slide in and out of the carrier easily, not getting tangled in the harness straps that feed up through the bottom of the carriers, where the harness straps buckle into a center point between the infant's legs.

Figure 5:
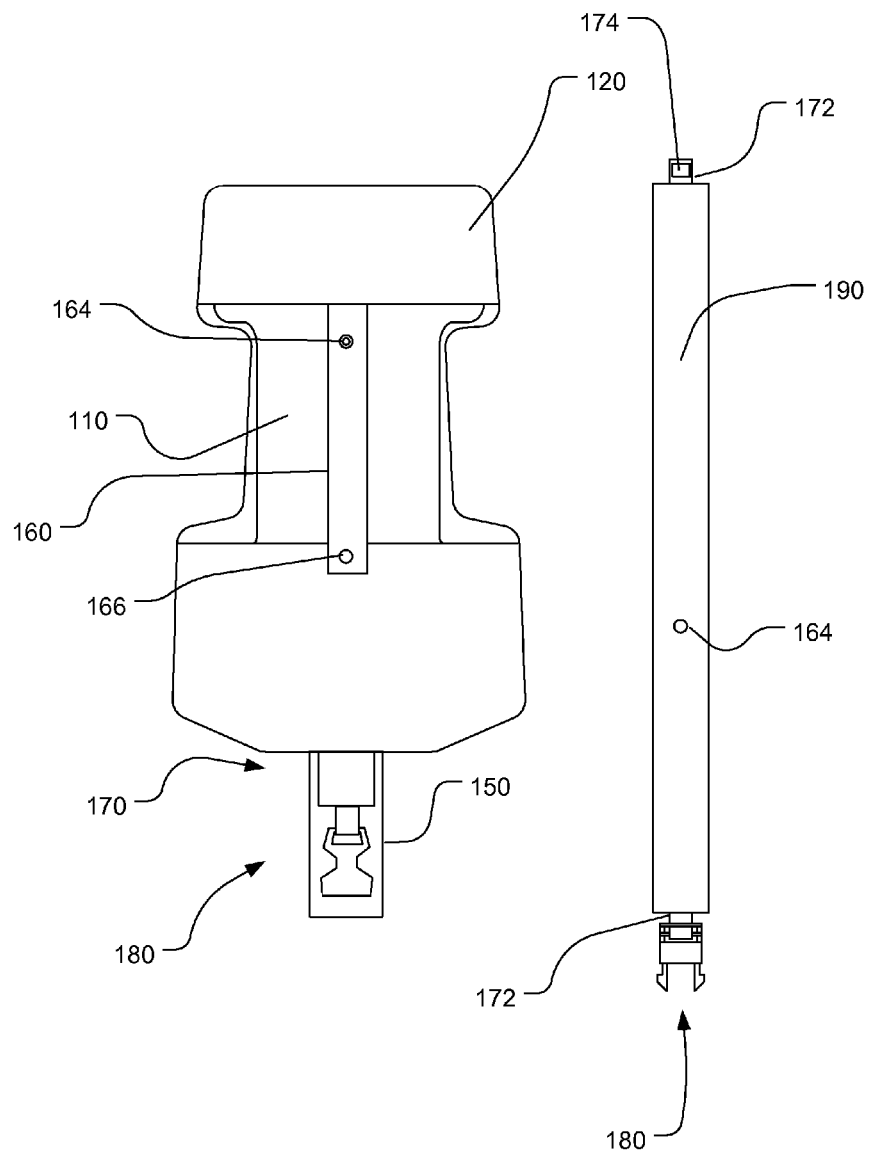
FIG. 5 illustrates a rear perspective view of an exemplary embodiment of an infant changing board in an upright configuration.

FIG. 5 illustrates a rear perspective view of an exemplary embodiment of an infant changing board 100 in an upright configuration. When viewed from the rear, it is easy to see the how the shaped support board 110 fits within the washable cover 120. The cover retention strap 160 is shown stretching between the top portion of the washable cover 120 and the bottom portion. A portion of the strap positioner 164 can be seen on the retention strap 160, with a corresponding portion present on the strap cover 190. The safety strap connector 180 is shown in its detached configuration in FIG. 5, with half the component attached to the safety strap stub 170 and half attached to the safety strap extension 172.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of the invention can be modified, if necessary, to employ the systems, functions, and concepts of the various references to provide yet further embodiments of the invention.

In light of the above "Detailed Description," the Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The above specification, examples and data provide a description of the structure and use of exemplary implementations of the described articles of manufacture and methods. It is important to note that many implementations can be made without departing from the spirit and scope of the invention.

What is claimed is:

1. An infant changing board, comprising:
   a shaped support board sized so as to fit within a child carrier, the shaped support board having side cut-outs to allow access for repositionable child carrier shoulder straps and wherein above and below the cut-outs, the shaped support board flares outwards to provide extra support for an infant's head and bottom;
   a washable cover having a front and a back and shaped so as to fit over the shaped support board, and wherein the washable cover is removable from the shaped support board;
   a cover retention strap attaching to the back of the washable cover via a removable first retention strap attachment and a second retention strap attachment, the cover retention strap extending along a back portion of the shaped support board and attaching to a top of the washable cover and to a bottom of the washable cover in order to retain the washable cover on the shaped support board;
   an adjustment handle comprising a strap extending out from the washable cover and providing a means of adjusting the position of the infant changing board within the child carrier from a generally upright configuration behind the infant's back to a generally horizontal changing configuration;
   a safety strap stub attaching to the bottom of the washable cover and being configured to attach to a safety strap extension;
   a safety strap connector connecting the safety strap stub to the safety strap extension; and
   a strap cover comprising a sleeve that removably covers the safety strap extension.

2. The infant changing board of claim 1, further comprising:
   a strap lock attached to the safety strap extension and detachably affixing the safety strap extension to the top rear of the child carrier.

3. The infant changing board of claim 1, wherein the safety strap extension comprises a stretchable strap extending from the safety strap connector, in proximity to the cover retention strap, and to a top rear of the child carrier.

4. The infant changing board of claim 2, wherein the safety strap extension comprises a stretchable strap extending from the safety strap connector, in proximity to the cover retention strap, and to a top rear of the child carrier.

5. The infant changing board of claim 1, further comprising:
   a strap positioner attached to the strap cover and allowing the strap cover to removably attach to the cover retention strap.

6. The infant changing board of claim 2, further comprising:
   a strap positioner attached to the strap cover and allowing the strap cover to removably attach to the cover retention strap.

7. The infant changing board of claim 3, further comprising:
   a strap positioner attached to the strap cover and allowing the strap cover to removably attach to the cover retention strap.

8. The infant changing board of claim 4, further comprising:
   a strap positioner attached to the strap cover and allowing the strap cover to removably attach to the cover retention strap.

9. The infant changing board of claim 1, wherein the shaped support board is made from a rigid plastic.

10. The infant changing board of claim 2, wherein the shaped support board is made from a rigid plastic.

11. The infant changing board of claim 3, wherein the shaped support board is made from a rigid plastic.

12. The infant changing board of claim 4, wherein the shaped support board is made from a rigid plastic.

13. The infant changing board of claim 5, wherein the shaped support board is made from a rigid plastic.

14. The infant changing board of claim 6, wherein the shaped support board is made from a rigid plastic.

15. The infant changing board of claim 7, wherein the shaped support board is made from a rigid plastic.

16. The infant changing board of claim 8, wherein the shaped support board is made from a rigid plastic.

* * * * *